US011808955B2

(12) United States Patent
Guler et al.

(10) Patent No.: US 11,808,955 B2
(45) Date of Patent: Nov. 7, 2023

(54) PLASMONIC METAL NITRIDE AND TRANSPARENT CONDUCTIVE OXIDE NANOSTRUCTURES FOR PLASMON ASSISTED CATALYSIS

(71) Applicant: Purdue Research Foundation, West Lafayette, IN (US)

(72) Inventors: Urcan Guler, Avon, CT (US); Alberto Naldoni, Turin (IT); Alexander V. Kildishev, West Lafayette, IN (US); Alexandra Boltasseva, West Lafayette, IN (US); Vladimir M. Shalaev, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/859,665

(22) Filed: Jul. 7, 2022

(65) Prior Publication Data
US 2022/0350057 A1 Nov. 3, 2022

Related U.S. Application Data

(62) Division of application No. 15/639,923, filed on Jun. 30, 2017, now Pat. No. 11,385,386.

(60) Provisional application No. 62/356,780, filed on Jun. 30, 2016.

(51) Int. Cl.
| G02B 5/00 | (2006.01) |
| H10K 50/854 | (2023.01) |
| B01J 27/24 | (2006.01) |
| B01J 35/00 | (2006.01) |
| C09C 1/36 | (2006.01) |
| B82Y 20/00 | (2011.01) |
| B01J 23/00 | (2006.01) |
| E06B 9/24 | (2006.01) |
| B01J 23/72 | (2006.01) |
| B01J 23/40 | (2006.01) |

(52) U.S. Cl.
CPC ............. *G02B 5/008* (2013.01); *B01J 27/24* (2013.01); *B01J 35/004* (2013.01); *C09C 1/3607* (2013.01); *H10K 50/854* (2023.02); *B01J 23/00* (2013.01); *B01J 23/40* (2013.01); *B01J 23/72* (2013.01); *B01J 35/0013* (2013.01); *B82Y 20/00* (2013.01); *E06B 2009/2464* (2013.01); *G02F 2203/10* (2013.01)

(58) Field of Classification Search
CPC ....... G02B 5/008; H10K 50/854; B01J 27/24; B01J 35/004; B01J 23/00; B01J 23/40; B01J 23/72; B01J 35/0013; C09C 1/3607; B82Y 20/00; E06B 2009/2464; G02F 2203/10
USPC ...................................................... 252/582
See application file for complete search history.

(56) References Cited

U.S. PATENT DOCUMENTS

2014/0333708 A1 11/2014 Ochi et al.
2014/0353577 A1* 12/2014 Agarwal ................ H10N 99/05
257/10

FOREIGN PATENT DOCUMENTS

WO 2004077453 9/2004

OTHER PUBLICATIONS

Office Action issued by the U.S. Patent and Trademark Office, dated Feb. 21, 2019, for U.S. Appl. No. 15/639,923, filed Jun. 30, 2017.
Office Action issued by the U.S. Patent and Trademark Office, dated Nov. 22, 2019, for U.S. Appl. No. 15/639,923, filed Jun. 30, 2017.
Office Action issued by the U.S. Patent and Trademark Office, dated Sep. 29, 2020, for U.S. Appl. No. 15/639,923, filed Jun. 30, 2017.
Office Action issued by the U.S. Patent and Trademark Office, dated Sep. 16, 2021, for U.S. Appl. No. 15/639,923, filed Jun. 30, 2017.
Notice of Allowance issued by the U.S. Patent and Trademark Office, dated Mar. 14, 2022, for U.S. Appl. No. 15/639,923, filed Jun. 30, 2017.
Linic, S., "Photochemical transformation on plasmonic metal nanoparticles", Nat Mater 2015, 14, 567.
Naldoni, A., "Solar-Powered Plasmon-Enchanced Heterogeneous Catalysis", Nanophotonics 2016, 5, 112.
Clavero., C., "Plasmon-induced hot-electron generation at nanoparticle/metal-oxide interfaces for photovoltaic and photocatalytic devices", Nat Phot. 2014, 8, 95.
Cao., L., "Plasmon-Assisted Local Temperature Control to Pattern Individual Semiconductor Nanowires and Carbon Nanotubes", Nano Lett. 2007, 7, 3523.
Adleman, J., "Heterogenous Catalysis Mediated by Plasmon Heating", Nano Lett 2009, 9, 4417.
Hung, W., "Plasmon Resonant Enhancement of Carbon Monoxide Catalysis" Nano Lett 2010, 10, 1314.

(Continued)

*Primary Examiner* — Ling Siu Choi
*Assistant Examiner* — Ronald Grinsted
(74) *Attorney, Agent, or Firm* — Purdue Research Foundation

(57) ABSTRACT

A nanostructured material system for efficient collection of photo-excited carriers is provided. They system comprises a plurality of plasmonic metal nitride core material elements coupled to a plurality of semiconductor material elements. The plasmonic nanostructured elements form ohmic junctions at the surface of the semiconductor material or at close proximity with the semiconductor material elements. A nanostructured material system for efficient collection of photo-excited carriers is also provided, comprising a plurality of plasmonic transparent conducting oxide core material elements coupled to a plurality of semiconductor material elements. The field enhancement, local temperature increase and energized hot carriers produced by nanostructures of these plasmonic material systems play enabling roles in various chemical processes. They induce, enhance, or mediate catalytic activities in the neighborhood when excited near the resonance frequencies.

20 Claims, 5 Drawing Sheets

(56) References Cited

OTHER PUBLICATIONS

Zhou, X., "Surface plasmon resonance-mediated photocatalysis by noble metal-based composites under visible light", J. Mater. Chem. 2012, 22, 21337.
Mukherjee, S., "Hot Electrons Do the Impossible: Plasmon-Induced Dissociation of $H_2$ on Au", Nano Lett. 2012, 13, 240.
Pincella, F., "A visible light-driven plasmonic photocatalyst", Light Sci Appl 2014, 3, e133.
Boyd, D., "Plasmon-Assisted Chemical Vapor Deposition", Nano Lett. 2006, 6, 2592.
Guler, U., "Colloidal Plasmonic Titanium Nitride Nanoparticles: Properties and Applications", Nanophotonics 2015, 4, 269.

\* cited by examiner

PLASMONIC METAL NITRIDE AND TRANSPARENT CONDUCTIVE OXIDE NANOSTRUCTURES FOR PLASMON ASSISTED CATALYSIS

CROSS-REFERENCE TO RELATED APPLICATIONS

The present patent application is a division of U.S. patent application Ser. No. 15/639,923, entitled "Plasmonic Metal Nitride and Transparent Conductive Oxide Nanostructures for Plasmon Assisted Catalysis," filed Jun. 30, 2017, which claims the priority benefit of U.S. Provisional Patent Application No. 62/356,780, entitled "Plasmonic Metal Nitride and Transparent Conductive Oxide Nanostructures for Plasmon Assisted Catalysis," filed Jun. 30, 2016, both disclosures of which are incorporated herein by reference.

STATEMENT REGARDING GOVERNMENT FUNDING

This invention was made with government support under DMR 1120923 awarded by the National Science Foundation and under N00014-10-1-0942 awarded by the Office of Naval Research. The government has certain rights in the invention.

TECHNICAL FIELD

The present application relates to photocatalysis systems, and more specifically, to a system and method for plasmon-assisted catalysis.

BACKGROUND

Plasmonic nanostructures exhibit resonances when illuminated with electromagnetic radiation in the visible and infrared regions of the spectrum. Due to resonant oscillations of electrons, the enhanced optical cross-sections of the subwavelength nanostructures enable localization of the incident electromagnetic energy in the form of the localized electromagnetic and thermal energies. Scattering of light by the resonant nanostructure results in the enhancement of electromagnetic energy within a confined volume around the structure while absorption of light results in the heating of the structure and nearby medium. Surface plasmons excited by the incoming electromagnetic radiation decay in time and generate hot carriers in the nanostructure. The field enhancement, local temperature increase and energized hot carriers play enabling roles in various chemical processes. Plasmonic nanostructures can induce, enhance, or mediate catalytic activity in the neighborhood when excited near the resonance frequencies. Some systems have used gold or other noble metals to form the plasmonic nanostructure. However, such noble metals form a Schottky barrier with titanium oxide, which is the typical photocatalyst that the nanostructure is coupled to. This barrier must be overcome in order to allow the required photo-excited hot carrier transfer to the catalyst, which reduces system efficiency. Therefore, improvements are needed in the field.

SUMMARY

According to one aspect, the present disclosure provides a nanostructured material system for efficient collection of photo-excited carriers. The system comprises a plurality of plasmonic metal nitride core material elements coupled to a plurality of semiconductor material elements. The semiconductor material elements may comprise oxides of the plasmonic metal nitrides. The plasmonic nanostructured elements form ohmic junctions at the surface of the semiconductor material or at close proximity with the semiconductor material elements.

According to another aspect, the present disclosure provides a nanostructured material system for efficient collection of photo-excited carriers, comprising a plurality of plasmonic transparent conducting oxide core material elements coupled to a plurality of semiconductor material elements.

According to another aspect, the present disclosure provides a nanostructured material system for efficient collection of photo-excited carriers, comprising a plurality of plasmonic metal nitride and a plurality of plasmonic transparent conducting oxide core material elements coupled to a plurality of semiconductor material elements.

BRIEF DESCRIPTION OF THE DRAWINGS

In the following description and drawings, identical reference numerals have been used, where possible, to designate identical features that are common to the drawings.

The attached drawings are for purposes of illustration and are not necessarily to scale.

DETAILED DESCRIPTION

Transition metal nitrides exhibit plasmonic resonances in the visible and near infrared regions and their performance can reach levels comparable to metals when the growth parameters of the materials are optimized. A significant superiority of some transition metal nitrides over metals is that they also exhibit refractory properties, meaning that they are durable materials at high temperatures. Titanium nitride (TiN) and zirconium nitride (ZrN) are two prominent refractory plasmonic transition metal nitrides. In addition to their good plasmonic performance and refractory properties, they also accommodate self-passivating native oxide layers, which can be removed by nitridation or further extended by oxidation.

Figure 1A:
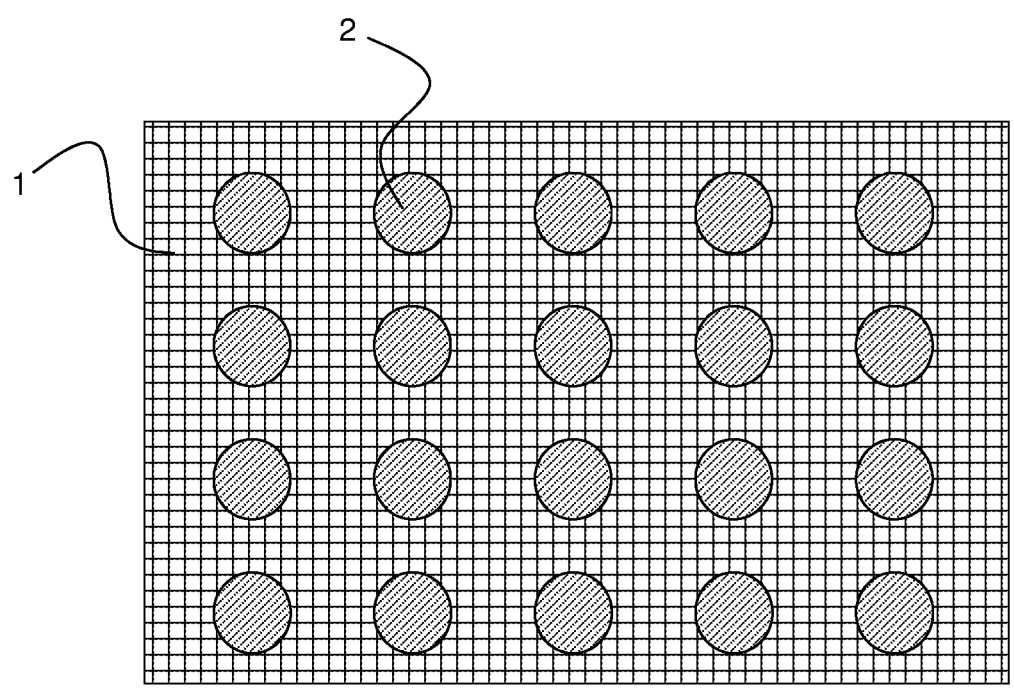
FIG. 1A is a top view diagram showing a plurality of nanostructures arranged on a substrate in preparation for plasmon-assisted chemical vapor deposition with transition metal nitrides as the plasmonic local heater according to one embodiment.
Figure 1B:
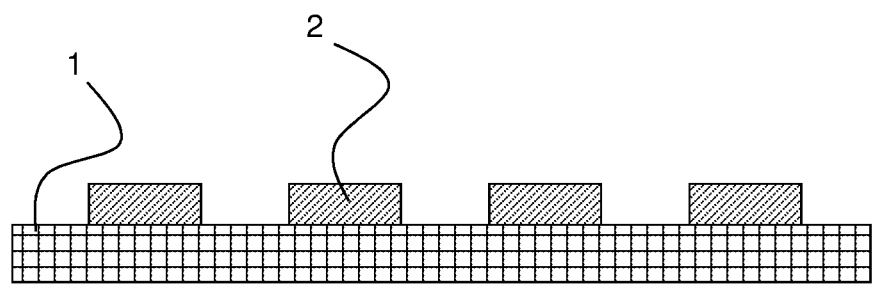
FIG. 1B is a side view diagram showing a plurality of nanostructures arranged on a substrate in preparation for plasmon-assisted chemical vapor deposition with transition metal nitrides as the plasmonic local heater according to one embodiment.
Figure 1C:
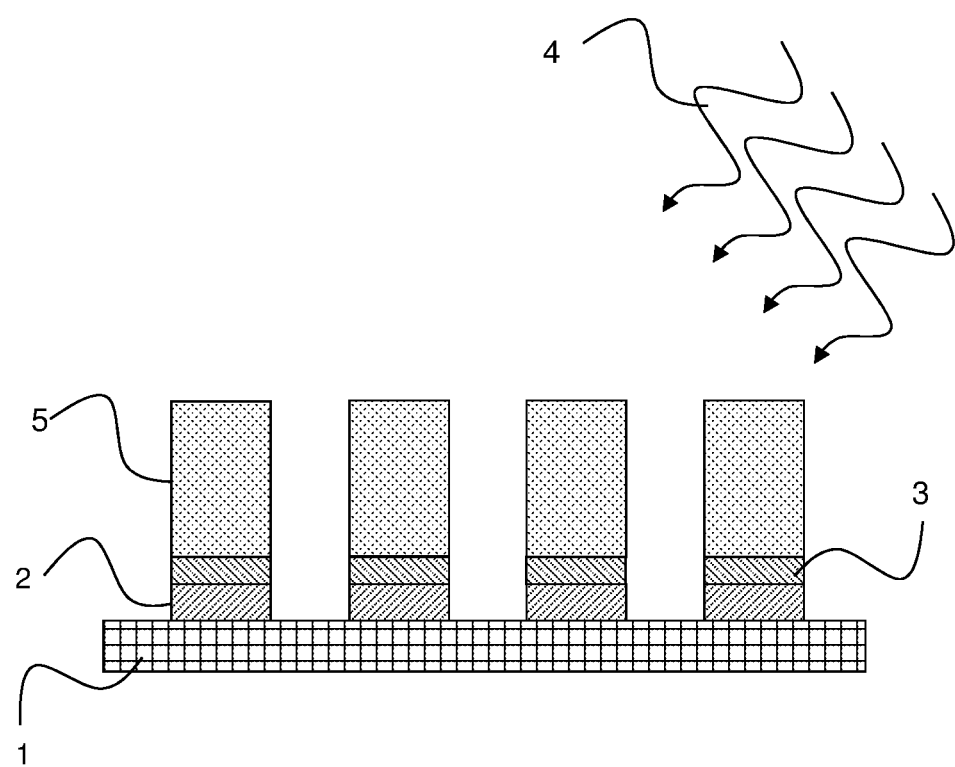
FIG. 1C is a side view diagram showing nanostructures arranged on a substrate after plasmon-assisted chemical vapor deposition with transition metal nitrides as the plasmonic local heater according to one embodiment.

According to one embodiment, a chemical vapor deposition (CVD) chemical process is enhanced via local heating and field enhancement through plasmonic resonance when illuminated by a light source 4 as shown in FIGS. 1B (side view) and 1C (top view). Precursors may be present in vapor and liquid forms in 'bulk' amounts in a reaction chamber surrounding a substrate 1, which may comprise, for example, magnesium oxide, sapphire, glass, silicon, fused silica, or the like. In cases where precursors are in liquid phase, vaporization may occur due to very high local temperatures near the plasmonic nanostructures 2 arrayed on a substrate 1 as shown in FIG. 1A, where a CVD growth layer 5 is initialized by a seed layer 3 as shown in FIG. 1C. The material composition of the seed layer 3 may comprise, for example, silicon, silica, silicon germanium, silicon nitride, carbon (including nanotubes, graphene, and diamond), or certain metals such as tungsten, however other seed layer materials may be used depending on the desired properties of the growth layer 5. Vacuum requirements of the growth chamber may be relaxed when the growth occurs in the bulk liquid precursor. In cases where precursors are in vapor phase, the chamber pressure may be atmospheric or any levels of vacuum down to $10^{-8}$ torr.

Figure 2:
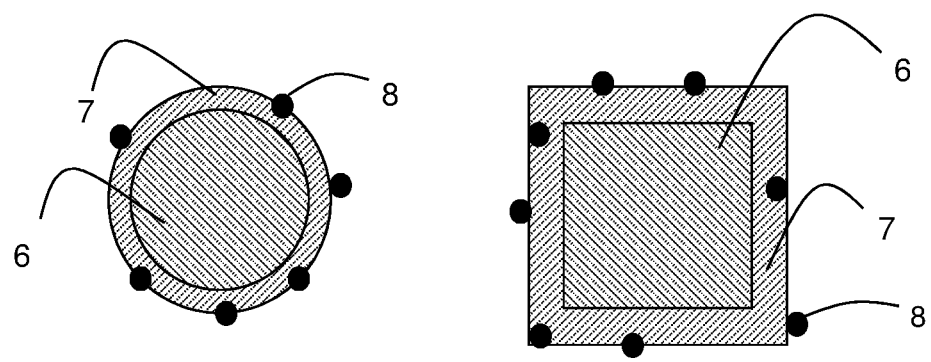
FIG. 2 is a diagram showing plasmonic nanostructures of titanium nitride of spherical and rectangular shapes covered with native oxide according to one embodiment.

As shown in FIG. 2, titanium nitride nanoparticles 6 absorb light in the visible and near infrared regions of the electromagnetic spectrum with efficiencies comparable to gold. Furthermore, the absorption peak of TiN nanoparticles is broader. This enables larger overall absorption and in return higher hot carrier generation. In addition, TiN forms an ohmic junction with $TiO_2$ (layer 7, FIG. 2), which is a benchmark photocatalyst, thereby enabling higher efficient plasmon-enhanced hot electron collection that can be utilized in applications such as solar harvesting and photodetection. Catalytic nanoparticles 8 may also be deposited on the surface of the TiO2 layer. The nanoparticles 8 may be formed from catalytic metals, such as Cu, Pt, Pd or the like. The absence of a barrier in the case of an ohmic junction further enhances the collection of 'cold electrons' due to interband transitions, significantly increasing the overall system efficiency. Similarly, TaN may be used as the nanoparticle 6 and paired with its semiconducting polymorph $Ta_3N_5$ or oxide (e.g., $Ta_2O_5$) as the layer 7. This approach may be further extended to other plasmonic materials, which have a Fermi level inside the conduction band, i. e. doped transparent conductive oxides, such as aluminum doped zinc oxide (AZO), gallium doped zinc oxide (GZO), or indium tin oxide (ITO), which are plasmonic in the near and mid-infrared ranges. In such cases, the core material is the doped transparent conductive oxide, and the surrounding semiconducting element is the corresponding semiconducting non-doped oxide (e.g., zinc oxide or tin oxide).

The formation of efficient junctions involving plasmonic transition metal nitrides and doped transparent conductive oxides can be generalized to the use of other common semiconductor used in solar energy conversion such as Si, $\alpha$-$Fe_2O_3$, and 2D transition metal dichalcogenides.

Figure 3:
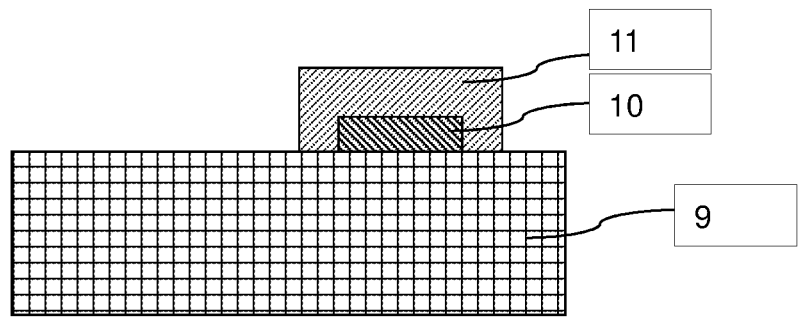
FIG. 3 is a structure for plasmon enhanced catalysis application with a transition metal nitride nanostructure as the plasmonic element according to one embodiment.

According to one embodiment, refractory transition metal nitrides form the core of a structure for plasmon-assisted catalysis such as biomass conversion, (photo) steam reforming, and carbon dioxide photoreduction, where the hot carriers generated from surface plasmon decay decrease the transition state energy of a certain chemical reaction and/or decrease the catalyst deactivation due to side effects such as "coke" formation, surface reconstruction, and metal passivation. As shown in FIG. 3, the structure may include the use of an inorganic nanocrystal 9 (e.g., $TiO_2$, $Al_2O_3$) as a support substrate material; plasmonic transition metal nitride nanoparticles 10 deposited on the facets of the support substrate; a catalytic metallic shell 11 formed from Cu, Pt, or Pd that covers the nanoparticles 10 providing thermal and chemical protection to the nanoparticles 10.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A nanostructured material system for efficient collection of photo-excited carriers, comprising:
    (a) a plurality of nanostructured elements, each nanostructured element including:
        (i) a plasmonic transparent conductive oxide core material element coupled with a corresponding semiconductor material element, and
        (ii) a plurality of catalytic metal nanoparticles separately deposited on a surface of each semiconductor material element; and
    (b) a substrate upon which each of the plurality of nanostructured elements is mounted;
    wherein the nanostructured elements are each configured to form ohmic junctions at the surface of the semiconductor material elements or in close proximity with the semiconductor material elements, wherein the nanostructured elements are operable to absorb broadband light to enhance hot carrier generation.

2. The system of claim 1, wherein the plasmonic transparent conductive oxide core material element includes aluminum-doped zinc oxide (AZO).

3. The system of claim 2, wherein the semiconductor material element includes titanium dioxide ($TiO_2$) or $TiO_xN_{1-x}$, where $0<x<1$.

4. The system of claim 1, wherein the plasmonic transparent conductive oxide core material element includes indium tin oxide (ITO).

5. The system of claim 4, wherein the semiconductor material element includes tantalum oxide ($Ta_xO_y$), wherein x and y>1.

6. The system of claim 5, wherein the semiconductor material element includes tantalum pentoxide ($Ta_2O_5$).

7. The system of claim 4, wherein the semiconductor material element includes $Ta_3N_5$.

8. The system of claim 1, wherein the plasmonic transparent conductive oxide core material element includes gallium doped zinc oxide (GZO).

9. The system of claim 1, wherein the semiconductor material element includes tantalum pentaoxide.

10. The system of claim 1, wherein the semiconductor material element includes zirconium dioxide.

11. The system of claim 1, wherein each catalytic metal nanoparticle of the plurality of catalytic metal nanoparticles includes copper, platinum, or palladium.

12. A nanostructured material system for efficient collection of photo-excited carriers, comprising:
    (a) a plurality of nanostructured elements, each nanostructured element including:

(i) a plasmonic transparent conductive oxide core material element coupled with a corresponding doped transparent conductive oxide material element, and (ii) a plurality of catalytic metal nanoparticles separately deposited on a surface of each doped transparent conductive oxide material element; and (b) a substrate upon which each of the plurality of nanostructured elements is mounted;

wherein the nanostructured elements are each configured to form ohmic junctions at the surface of the doped transparent conductive oxide material element or in close proximity with the doped transparent conductive oxide material element, wherein the nanostructured elements are operable to absorb broadband light to enhance hot carrier generation.

13. The system of claim 12, wherein the plasmonic transparent conductive oxide core material element includes aluminum-doped zinc oxide (AZO).

14. The system of claim 12, wherein the doped transparent conductive oxide material element includes titanium dioxide ($TiO_2$) or $TiO_xN_{1-x}$, where $0<x<1$.

15. The system of claim 12, wherein the plasmonic transparent conductive oxide core material element includes gallium doped zinc oxide (GZO).

16. The system of claim 12, wherein the doped transparent conductive oxide material element includes tantalum oxide ($Ta_xO_y$), wherein x and y>1.

17. The system of claim 12, wherein the doped transparent conductive oxide material element includes $Ta_3N_5$, tantalum pentaoxide ($Ta_2O_5$), or zirconium dioxide.

18. The system of claim 12, wherein the plasmonic transparent conductive oxide core material element includes indium tin oxide (ITO).

19. The system of claim 12, wherein each catalytic metal nanoparticle of the plurality of catalytic metal nanoparticles includes copper, platinum, or palladium.

20. A nanostructured material system for efficient collection of photo-excited carriers, comprising:

(a) a plurality of nanostructured elements, each nanostructured element including:

(i) a plasmonic conductive oxide core material element coupled with a corresponding semiconductor material element, and (ii) a plurality of catalytic metal nanoparticles separately deposited on a surface of each semiconductor material element, wherein each catalytic metal nanoparticle of the plurality of catalytic metal nanoparticles includes copper, platinum, or palladium; and (b) a substrate upon which each of the plurality of nanostructured elements is mounted;

wherein the nanostructured elements are each configured to form ohmic junctions at the surface of the semiconductor material elements or in close proximity with the semiconductor material elements.

* * * * *